(12) United States Patent
Shimada (10) Patent No.: US 9,021,253 B2
(45) Date of Patent: *Apr. 28, 2015

(54) QUARANTINE METHOD AND SYSTEM (71) Applicant: International Business Machines Corporation, Armonk, NY (US)

(72) Inventor: Katsuhiko Shimada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/676,416

(22) Filed: Nov. 14, 2012

(65) Prior Publication Data
US 2013/0073844 A1 Mar. 21, 2013

Related U.S. Application Data (63) Continuation of application No. 11/571,527, filed as application No. PCT/JP2005/011916 on Jun. 29, 2005, now Pat. No. 8,359,464.

(30) Foreign Application Priority Data

Jul. 2, 2004 (JP) .................................. 2004-197387

(51) Int. Cl.
*H04L 29/06* (2006.01)
*H04L 29/12* (2006.01)

(52) U.S. Cl.
CPC .............. *H04L 63/08* (2013.01); *H04L 63/0209* (2013.01); *H04L 63/0823* (2013.01); *H04L 63/1433* (2013.01); *H04L 61/2015* (2013.01)

(58) Field of Classification Search
None
See application file for complete search history.

(56) References Cited

U.S. PATENT DOCUMENTS 6,725,376 B1 *  4/2004  Sasmazel et al. ............... 726/10
7,111,321 B1     9/2006  Watts et al.
(Continued)

FOREIGN PATENT DOCUMENTS

| EP | 1427163 | 6/2004 |
|----|---------|--------|
| JP | 2003-233504 | 8/2003 |
| JP | 2004-094290 | 3/2004 |

OTHER PUBLICATIONS

Yoshida et al.; Protecting Yourself from Viruses Carried in Notebook PCs; Nikkei Internet Solutions; Dec. 2003; http://nit.nikkeibp.co.jp; 50 pages (original Japanese text and English translation).

(Continued)

*Primary Examiner* — Brandon Hoffman
(74) *Attorney, Agent, or Firm* — Schmeiser, Olsen & Watts, LLP; John Pivnichny (57) ABSTRACT

A quarantine method and system for allowing a client terminal to connect to a user network. An authentication apparatus recognizes that a communication means of the client terminal has been activated. The authentication apparatus confirms a common certificate for the client terminal. An Internet Protocol (IP) address is provided to the client terminal to enable the client terminal to log in to the quarantine network. A first authentication server security checks the client terminal to determine whether each check item of at least two check items has a violation. The client terminal is allowed to connect to the user network, via a second authentication server confirming a user certificate for the client terminal followed by the second authentication server storing the user certificate in the client terminal. The security measure server, the first authentication server, and the second authentication server are physically distinct hardware servers.

20 Claims, 8 Drawing Sheets

(56) References Cited

U.S. PATENT DOCUMENTS

| | | | |
|---|---|---|---|
| 7,284,062 | B2 | 10/2007 | Krantz et al. |
| 8,194,537 | B2 | 6/2012 | Nomi |
| 2004/0103310 | A1 | 5/2004 | Sobel et al. |
| 2004/0103317 | A1 | 5/2004 | Burns |
| 2004/0107360 | A1 | 6/2004 | Herrmann et al. |
| 2005/0131997 | A1 | 6/2005 | Lewis et al. |
| 2005/0267954 | A1* | 12/2005 | Lewis et al. ............ 709/221 |
| 2005/0273853 | A1* | 12/2005 | Oba et al. ............ 726/22 |

OTHER PUBLICATIONS

Microsoft Corporation; Microsoft Windows Server 2003 Network Access Quarantine Control; Microsoft Windows Server 200;, Mar. 1, 2003; 37 pages; XP-002994719.

Gupta, V.; Sun Labs; Flexible Authentication for DHCP Messages <draft-gupta-dhcp-auth-02.txt>; Dynamic Host Configuration Working Group, IETF Standard-Workin GDRAFT, Internet Engineering Task Force, IETF, CH, No. 2, Feb. 28, 2003, XP-015001046; 17 pages.

Office Action (Mail Date Sep. 10, 2009) for U.S. Appl. No. 11/571,527, filed Jan. 2, 2007.

Amendment filed Dec. 10, 2009 in response to Office Action (Mail Date Sep. 10, 2009) for U.S. Appl. No. 11/571,527, filed Jan. 2, 2007.

Final Office Action (Mail Date Mar. 12, 2010) for U.S. Appl. No. 11/571,527, filed Jan. 2, 2007.

Request for Continued Examination and Amendment after Final filed May 10, 2010 in response to Final Office Action (Mail Date Mar. 12, 2010) for U.S. Appl. No. 11/571,527, filed Jan. 2, 2007.

Advisory Action (Mail Date May 21, 2010) for U.S. Appl. No. 11/571,527, filed Jan. 2, 2007.

Office Action (Mail Date Sep. 1, 2010) for U.S. Appl. No. 11/571,527, filed Jan. 2, 2007.

Amendment filed Nov. 29, 2010 in response to Office Action (Mail Date Sep. 1, 2010) for U.S. Appl. No. 11/571,527, filed Jan. 2, 2007.

Final Office Action (Mail Date Feb. 15, 2011) for U.S. Appl. No. 11/571,527, filed Jan. 2, 2007.

Request for Continued Examination and Amendment After Final filed May 3, 2011, in response to Final Office Action (Mail Date Feb. 15, 2011) for U.S. Appl. No. 11/571,527, filed Jan. 2, 2007.

Supplemental Amendment filed Jun. 30, 2011 in response to Final Office Action (Mail Date Feb. 15, 2011) for U.S. Appl. No. 11/571,527, filed Jan. 2, 2007.

Office Action (Mail Date Jul. 11, 2011) for U.S. Appl. No. 11/571,527, filed Jan. 2, 2007.

Office Action (Mail Date Oct. 11, 2011) for U.S. Appl. No. 11/571,527, filed Jan. 2, 2007.

Final Office Action (Mail Date Dec. 5, 2011) for U.S. Appl. No. 11/571,527, filed Jan. 2, 2007.

Amendment After Final filed Feb. 3, 2012 in response to Final Office Action (Mail Date Dec. 5, 2011) for U.S. Appl. No. 11/571,527, filed Jan. 2, 2007.

Advisory Action (Mail Date Feb. 29, 2012) for U.S. Appl. No. 11/571,527, filed Jan. 2, 2007.

Notice of Appeal filed Mar. 5, 2012 in response to Advisory Action (Mail Date Feb. 29, 2012) for U.S. Appl. No. 11/571,527, filed Jan. 2, 2007.

Appeal Brief filed May 7, 2012 in response to Advisory Action (Mail Date Feb. 29, 2012) for U.S. Appl. No. 11/571,527, filed Jan. 2, 2007.

Notice of Allowance (Mail Date Sep. 14, 2012) for U.S. Appl. No. 11/571,527, filed Jan. 2, 2007.

Microsoft Windows Server 2003 Network Access Quarantine Control, Published Oct. 31, 2003, 35 pages, XP055091787.

European Patent Office Examination report dated Dec. 13, 2013, IBM United Kingdom IP Law office, Application No. 05 765 358.6, 8 pages.

\* cited by examiner

Detailed Security Report

| Check Items | | Requirement | System setup value | | | |
|---|---|---|---|---|---|---|
| Power-on password | ✗ | Set Power-on password | Password not yet set | | | |
| Hard disk password | ✓ | Set hard disk password | Password is set | | | |
| Screen saver | ✓ | Keyboard/screen must be locked with a password. Period that elapses before it starts should not exceed 30 minutes. | Account | Screen saver currently running | Screen saver protected by a password | Inactivity period |
| | | | | Yes | Yes | 15 minutes |
| Virus software | ✓ | Install and run an AntiVirus program AntiVirus LiveUpdate is to be executed at least once a week | Version of installed AntiVirus | AntiVirus currently running | | Execution frequency for LiveUpdate |
| | | | 7.61.941 | Yes | | Daily |
| Personal Firewall | ⌘ | Before connecting a workstation directly to an external network, a user must install and run an approved personal firewall program | Version of installed firewall | Firewall service currently running | | Firewall currently running |
| | | | None | None | | No |

QUARANTINE METHOD AND SYSTEM

This application is a continuation application claiming priority to Ser. No. 11/571,527, filed Jan. 2, 2007, now U.S. Pat. No. 8,359,464, issued Jan. 22, 2013.

TECHNICAL FIELD

The present invention relates to a quarantine system, for example, and more particularly to a system and a method for quarantining a client terminal connected to a network.

BACKGROUND ART

With the ongoing development of network technologies, a number of computers serving as client terminals are connected to a network. Accordingly, the incidence of software damage inflicted by computer viruses and of malicious client terminal intrusions by hackers and crackers, who seek out and exploit vulnerability of software, is growing. Therefore, adequate security measures have become vitally important for client terminals.

If the number of client terminals is limited to the extent that a network administrator can control them, the network administrator may alert users to the need for security measures, so that security measures can be taken by updating security patches for OSs or by downloading virus pattern files. Especially, regarding download of virus pattern files, a method of taking security measures is known in which when a client terminal is connected to a network, such as Local Area Network (hereinafter referred to as "LAN"), a virus measure file is automatically transmitted to the client terminal, which reduces the labor required of the network administrator (see, for example, Patent Document 1).

Patent Document 1: Japanese Published Patent Application 2003-233504

DISCLOSURE OF THE INVENTION

Problems to be Solved by the Invention

However, since the technique of Patent Document 1 takes the virus measure by connecting a client terminal to a LAN, it would cause a problem when a client terminal previously infected with a virus is connected to the LAN, that is, the connection would serve to spread the virus throughout the LAN, damaging servers and other client terminals connected to the LAN.

Further, what is important as security measures for a network such as LAN is not limited to measures against viruses. For example, the above-mentioned updating of security patches for OSs is also important to prevent hacker and cracker intrusions through security holes.

Furthermore, when a client terminal with insufficient password setting is connected to a LAN, another person using this client terminal could crack the password. For example, when a password having a length shorter than a prescribed length is set as a password for unlocking a screen saver, an illegal intruder could easily crack the password and intrude into the LAN. Therefore, for security measures, it is also important to confirm password settings in client terminals.

Additionally, for a client terminal that has activated a software program constituting a security risk (hereinafter referred to as "inhibited software"), e.g., a program for enabling a LAN access, such as SoftEther, that bypasses proxies and firewalls installed in the LAN, it is important that a connection to the LAN be inhibited until the client terminal has halted the inhibited software.

A demand exists for a client terminal quarantine system that can provide the above described security measures for a large number of client terminals, without imposing any burden on a network administrator.

In view of the above, an objective of the present invention is to provide a quarantine system and a quarantine method for taking thoroughgoing security measures for a larger number of client terminals.

Means for Solving Problems

The inventor of the present application has made a deeper study to achieve this objective, leading to a system that, when a client terminal is connected to the system, first authenticates the client terminal, using a common certificate, and connects it to a network for taking security measures; and after the security measures are completed, it authenticates the client terminal, using a user certificate, and connects the client terminal to a user network. More specifically, the present invention provides the following quarantine system.

A quarantine system comprises a client terminal having communication means, an authentication apparatus connected to the client terminal, and a quarantine apparatus connected to the authentication apparatus, wherein the quarantine apparatus includes a first authentication server, a security server, a quarantine network to which the first authentication server, the security server and the authentication apparatus are connected, and a user network to which a second authentication server and the authentication apparatus are connected, wherein the authentication apparatus recognizes that the communication means of the client terminal is started, in response to start-up of an OS of the client terminal and activation of the communication means of the client terminal, wherein the second authentication server authenticates the client terminal, sets a common certificate for the client terminal via the authentication apparatus, permits connection of the client terminal to the quarantine network, re-authenticates the client terminal in response to completion of security measures for the client terminal via the quarantine network, sets a user certificate for the client terminal, and permits connection of the client terminal to the user network, and wherein the first authentication server performs security check for the client terminal, and takes required security measures in cooperation with the security server when it is determined, based on the security check, that the security measures are required for the client terminal.

According to the present invention, before the client terminal to be connected is connected to a primary LAN (user network) to which servers or the like are connected, a common certificate is used to connect the client terminal to a quarantine network, security check is performed via the quarantine network, security measure is taken for the client terminal when it is required for the client terminal, and the client terminal is connected to the user network by using a user certificate after the completion of the security measure.

More specifically, a quarantine method in a system comprising a client terminal, an authentication apparatus connected to the client terminal, and a quarantine apparatus connected to the authentication apparatus, wherein the quarantine apparatus includes a first authentication server, a security server, a quarantine network to which the first authentication server, the security server and the authentication apparatus are connected, and a user network to which a second authentication server and the authentication apparatus are connected, is provided which comprises the steps of the authentication apparatus recognizing that communication means of the client terminal is started, in response to start-up of an OS of the client terminal and activation of the communication means of the client terminal, the second authentication server authenticating the client terminal and permitting connection of the client terminal to the quarantine network by setting a common certificate for the client terminal via the authentication apparatus, the first authentication server performing security check for the client terminal via the quarantine network, the first authentication server taking required security measures in cooperation with the security server when it is determined, based on the security check, that the security measures are required for the client terminal, and the second authentication server re-authenticating the client terminal, setting a user certificate for the client terminal via the authentication apparatus, and permitting connection of the client terminal to the user network.

Accordingly, when the client terminal is connected to a network, such as an intranet, the system does not immediately connect the client terminal to a primary network (user network) to which servers or the like are connected, and appropriately takes security measures for the client terminal before permitting the client terminal to connect to the user network. Thus, unlike the conventional case, the system can fully satisfy security management without compromising the security of the user network and without imposing a burden on a network administrator. Further, for each of a large number of client terminals connected to the network, the system can perform security check and take security measures upon activation of the communication means of the client terminal, and can easily provide appropriate security management at a fixed or higher level. That is, according to the present invention, a quarantine system and a quarantine method are provided that can take thoroughgoing security measures for a large number of client terminals.

Advantages of the Invention

In the present invention, when the client terminal is connected to the network, such as an intranet, the system does not immediately connect the client terminal to a primary network (user network) to which servers or the like are connected, and appropriately takes security measures for the client terminal before permitting the client terminal to connect to the user network. Therefore, the system permits only a client terminal that maintains a satisfactory security level to be connected to the user network, and unlike the conventional case, can fully satisfy security management without compromising the security of the user network and without imposing a burden on a network administrator.

Further, for each of a large number of client terminals connected to the network, the system can perform security check and take security measures upon activation of the communication means of the client terminal, and can easily provide appropriate security management at a fixed or higher level. That is, according to the present invention, a quarantine system and a quarantine method are provided that can take thoroughgoing security measures for a large number of client terminals.

BEST MODE FOR CARRYING OUT THE INVENTION

The preferred embodiment of the present invention will now be described with reference to the drawings.

Figure 1:
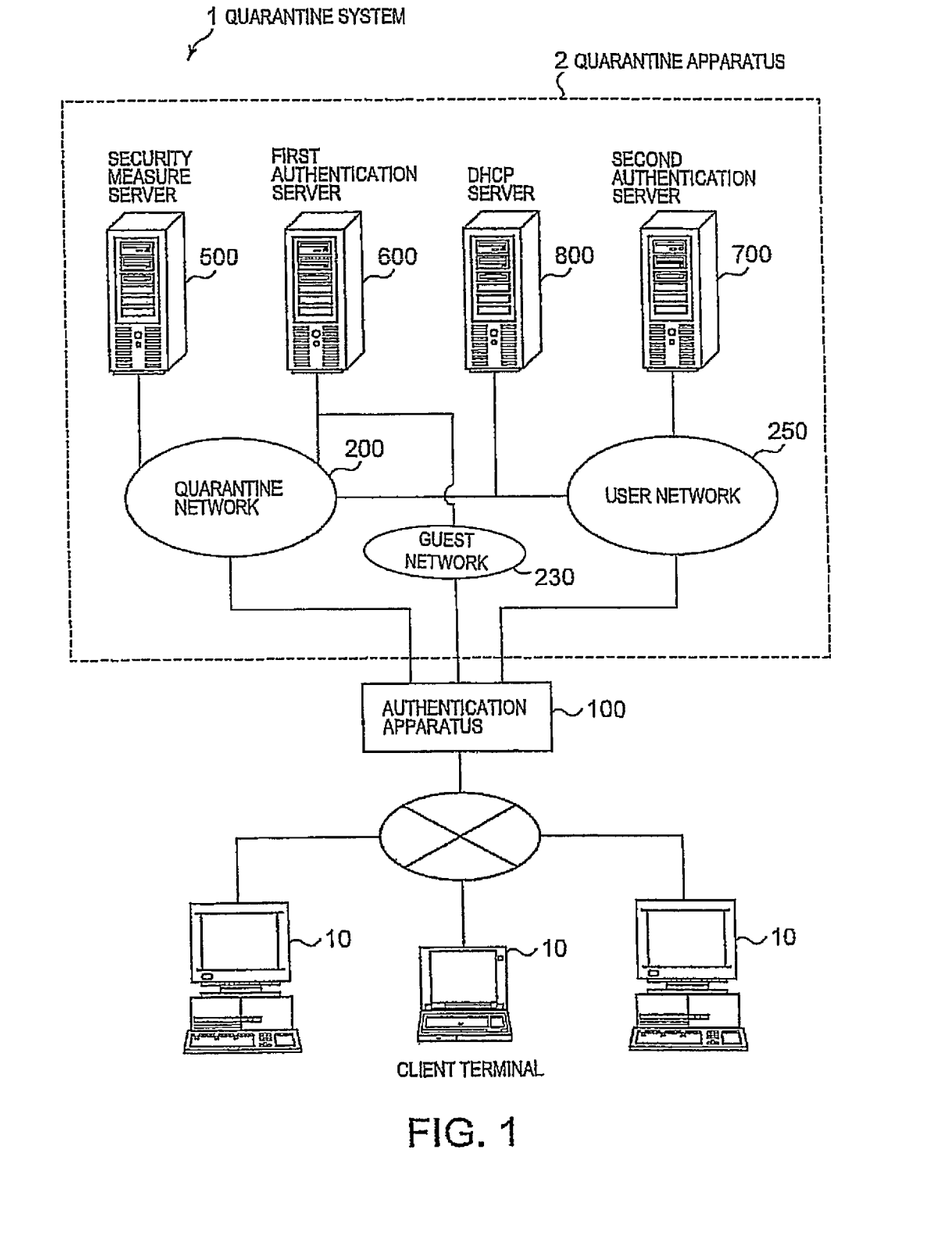
FIG. 1 is a diagram showing the hardware configuration of a quarantine system according to the present invention.

As shown in FIG. 1, a quarantine system 1 comprises a plurality of client terminals 10, an authentication apparatus 100 connected to the client terminals 10, and a quarantine apparatus 2. The quarantine apparatus 2 includes a quarantine network 200 and a user network 250, to which the authentication apparatus 100 is separately connected, a security measure server 500 and a first authentication server 600, both connected to the quarantine network 200, and a second authentication server 700 and a DHCP (Dynamic Host Configuration Protocol) server 800, both connected to the user network 250.

Figure 2:
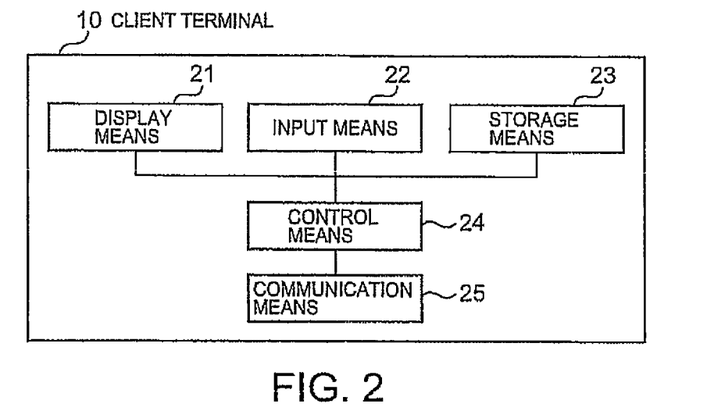
FIG. 2 is a diagram showing the hardware configuration of a client terminal.

As shown in FIG. 2, each client terminal 10 includes display means 21, such as a CRT display or a liquid crystal display, input means 22, such as a keyboard, a ten-key pad and a mouse, storage means 23, such as a hard disk drive and a memory, control means 24, such as a CPU, and communication means 25, such as a network interface card (hereinafter referred to as "NIC").

The client terminal 10 has a client function for accessing a data source through the user network 250. The client terminal 10 may be either an ordinary computer, such as a desktop PC or a notebook PC, or a portable information terminal, such as a PDA. The present invention provides the quarantine system 1 that performs security check and security measure for the client terminal 10.

The storage means 23 of the client terminal 10 installs agent software therein for the quarantine system 1. The agent software is installed in principle before the client terminal 10 is connected to the quarantine system 1. If the agent software is not installed in the client terminal 10, security check and security measures are performed after the client terminal 10 has installed the agent software. The agent software is a program for mainly performing security check and security measures.

The client terminals 10 and the authentication apparatus 100 are connected by a network, which may be wired or wireless. Further, the client terminals 10 may be located in remote positions and connected to the authentication apparatus 100 via public communication lines.

Figure 3:
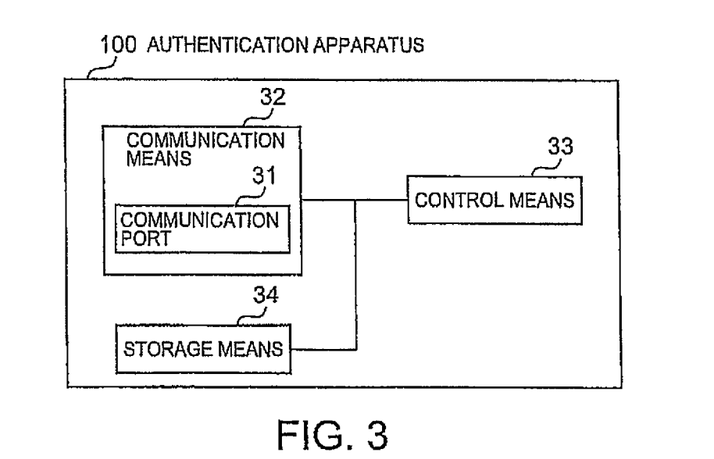
FIG. 3 is a diagram showing the hardware configuration of an authentication apparatus.

As shown in FIG. 3, the authentication apparatus 100 is a network switch that includes a communication port 31 capable of connecting to the client terminals 10, the quarantine network 200 and the user network 250, storage means 34, and control means 33. The authentication apparatus 100 may store, in the storage means 34, hardware information of connected client terminals 10, such as a media access control (hereinafter referred to as a "MAC") address.

The control means 33 of the authentication apparatus 100 recognizes that the operating system (hereinafter referred to as "OS") of the client terminal 10 is started. In this authentication, the 802.1X protocol may be used. When start-up of the OS of the client terminal 10 is recognized, the control means 33 instructs the second authentication server 700 to authenticate the client terminal 10. The second authentication server 700 attempts to confirm a common certificate for the client terminal 10, and when it is successful, the second authentication server 700 restarts the NIC of the communication means 25 of the client terminal 10, and instructs the DHCP server 800 to provide an Internet protocol (hereinafter referred to as an "IP") address for logging in to the quarantine network 200. The DHCP server 800 is a computer connected to the user network 250 and the quarantine network 200. The DHCP server 800 provides an appropriate IP address for connection to the quarantine network 200 to the client terminal 10.

The control means 33 of the authentication apparatus 100 instructs the second authentication server 700 to authenticate the client terminal 10 when the client terminal 10 completes security measures. The second authentication server 700 examines a user certificate for the client terminal 10. If the client terminal is authenticated (or re-authenticated), the second authentication server 700 again restarts the NIC of the client terminal 10 and instructs the DHCP server 800 to provide an IP address for logging in to the user network 250 to the client terminal 100. The DHCP server 800 provides an appropriate IP address for connection to the user network 250 to the client terminal 10.

The quarantine network 200 is a network to which the client terminal 10 first logs in, and is used to take security measures for the client terminal 10.

The user network 250 is a network corresponding to an ordinary LAN to which a server fundamental to the system, such as a database server, is connected. Further, the user network 250 is a network to which only a client terminal 10, in which security measures are completed or any check items are not pointed out in the security check, can log in.

Each of the quarantine network 200 and the user network 250 may be a virtual LAN (hereinafter referred to "ULAN"), or a wired or wireless network.

The security measure server 500 is a computer that takes security measures for the client terminal 10 under the control of the first authentication server 600. When the client terminal 10 is connected to the quarantine network 200, the security measure server 500 takes security measures for the client terminal 10. The security measure server 500 may be included in the first authentication server 600.

The first authentication server 600 is a computer that performs security check for the client terminal 10. The first authentication server 600 performs security check for the client terminal 10 via the quarantine network 200, and also takes security measures in cooperation with the security measure server 500.

The second authentication server 700 is a computer that authenticates the client terminals 10. A common certificate and user certificates are stored in the second authentication server 700 in advance to authenticate the client terminals 10. The second authentication server 700 authenticates a client terminal 10 using a common certificate when the authentication apparatus 100 recognizes that the communication means 25 of the client terminal 10 is started, and authenticates the client terminal 10 using a user certificate when security measures for the client terminal 10 are completed. The common certificate and the user certificate are issued by a CA (Certification Authority) server, and stored in the second authentication server 700.

Figure 4:
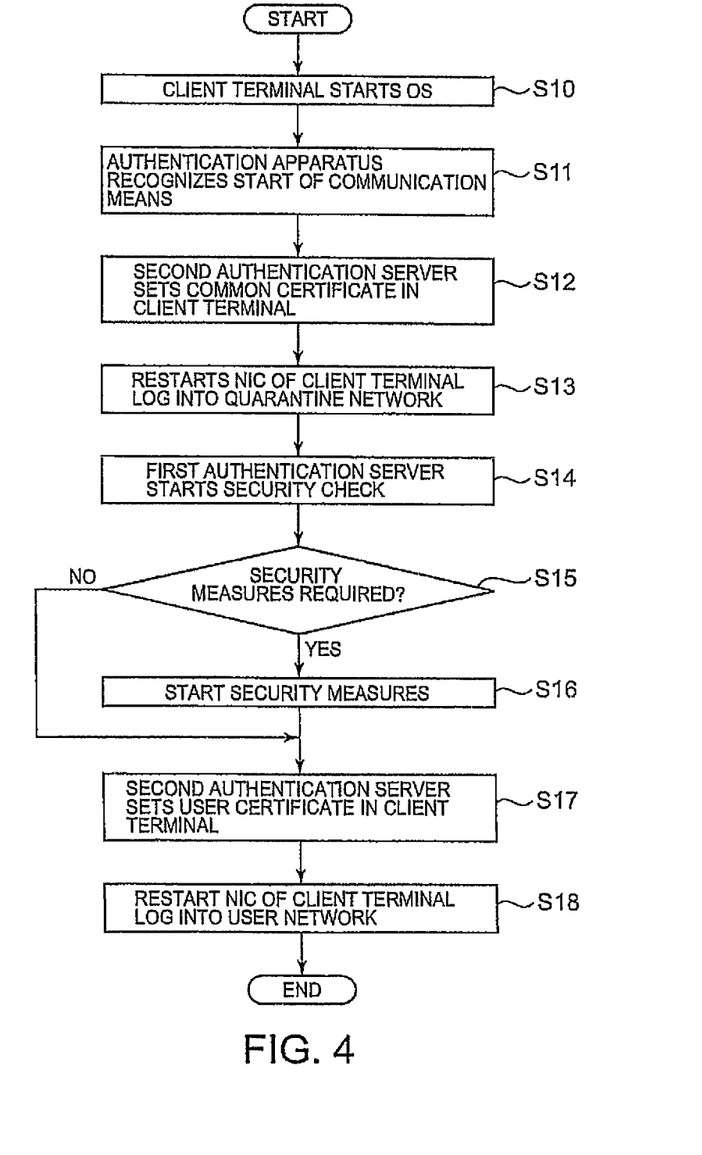
FIG. 4 is a flowchart showing the operation of the quarantine system.

A specific operation of the quarantine system 1 will now be explained with reference to the flowchart in FIG. 4.

A user logs in from a client terminal 10 to a system. Usually, any client terminal 10 connected to the system may log in to the system after its OS is started, and the quarantine system 1 starts to operate (S10). For example, the quarantine system 1 starts when the agent software stored in the client terminal 10 starts to operate as the OS is started, and the agent software notifies the authentication apparatus 100 that the authentication apparatus 100 recognizes that the OS and the communication means 25 (such as NIC) of the client terminal 10 have been started. For a client terminal 10 that is not always connected to the quarantine system 1, the present quarantine system may start to operate when the client terminal 10 is connected to the system (a hub, a switch, or the like connected to the authentication apparatus 100).

The authentication apparatus 100 recognizes that the client terminal 10 has started the communication means 25 (S11). The authentication apparatus 100 confirms what terminal this client terminal 10 is to the second authentication server 700. Specifically, the authentication apparatus 100 confirms the common certificate for the client terminal 10 to the second authentication server 700. When the authentication apparatus 100 can confirm the common certificate for the client terminal 10, the second authentication server 700 sets the common certificate in the client terminal 10 (S12). In the confirmation of the common certificate, a user ID and a password entered by the user from the client terminal 10 may be referred to.

Next, the control means 33 of the authentication apparatus 100 restarts the NIC of the client terminal 10, and the DHCP server 800 provides an IP address for logging in to the quarantine network 200 to the client terminal 10 (S13). Thus, the client terminal 10 can log in to the quarantine network 200.

After the client terminal 10 is connected to the quarantine network 200, the first authentication server 600 performs security check for the client terminal 10 via the quarantine network 200 (S14). When the first authentication server 600 determines that security measures are required for the client terminal 10 (S15), the first authentication server 600 instructs the security measure server 500 to start security measures.

Upon receiving this instruction, the security measure server 500 starts security measures (S16). If no security measure is required for the client terminal 10, the process proceeds to step S17 without taking any security measure (S15). The above described security check may be performed by the security measure server 500.

When the security measures have been taken for the client terminal 10, it is permitted to be connected to the user network 250. Specifically, the authentication apparatus 100 requests the second authentication server 700 to confirm a user certificate for the client terminal 10. If the user certificate for the client terminal 10 is confirmed, the second authentication server 700 sets the user certificate in the client terminal (S17).

Next, the second authentication server 700 restarts the NIC of the client terminal 10, and provides an IP address for logging in to the user network 250 (S18) to the client terminal 10. In this manner, the client terminal 10 is permitted to log in to the user network 250.

Figure 5:
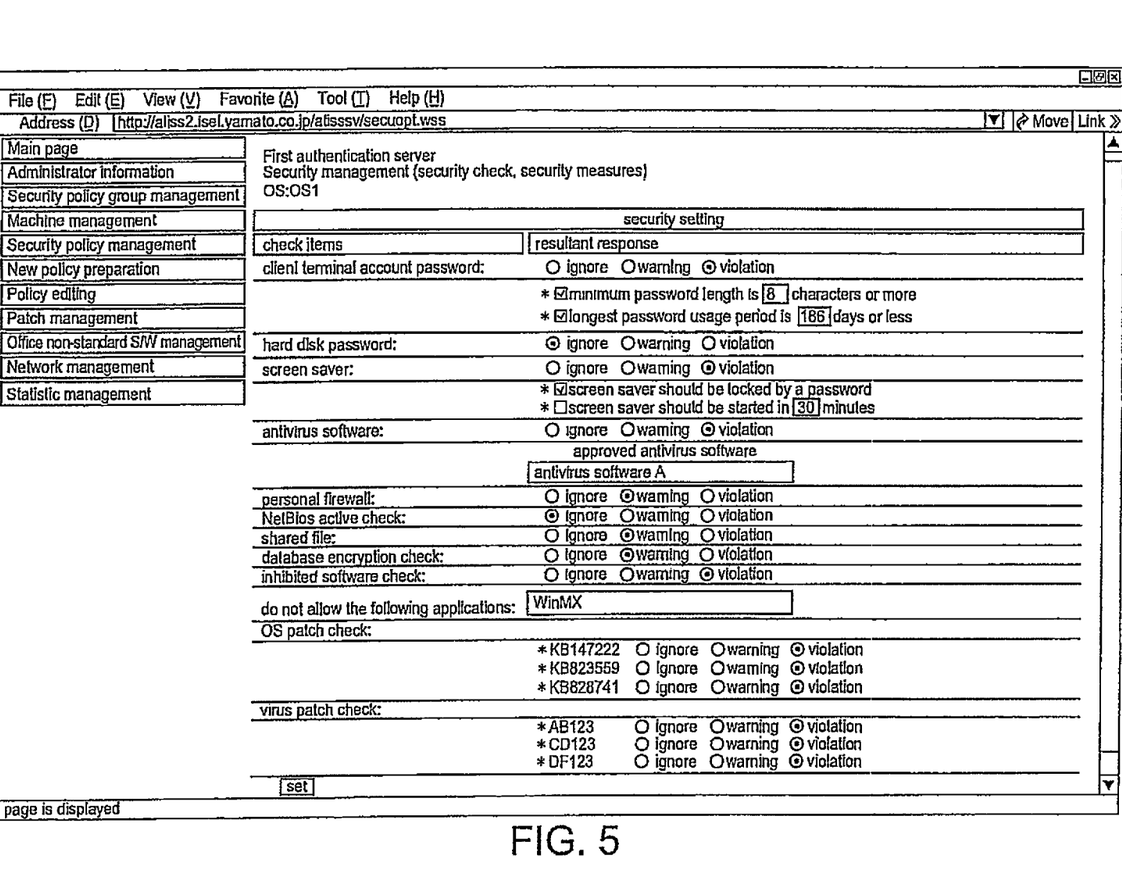
FIG. 5 is a diagram showing an example screen on which an administrator sets security check items and security measures items set in a first authentication server.

The security check performed and the security measures taken for each of the client terminals 10 are set in the first authentication server 600. FIG. 5 shows an example screen displayed to set the security check in the first authentication server 600. This example shows a setting for an OS1 (e.g., Windows® 2000 or Windows® XP) employed as the OS.

That is, since security patch types vary depending on the OS, different security check items are provided for each OS.

"Check items" are items to be verified during security check. If a client terminal 10 falls under any of the check items, the first authentication server 600 requests the agent software stored in the client terminal 10 to perform a "Resultant response" process. "Resultant response" has three items "Ignore", "Warning" and "Violation".

"Ignore" indicates that no action is required of the agent software even if the client terminal 10 falls under the corresponding check item. "Warning" indicates that a warning has to be issued to a user of the client terminal 10. "Violation" indicates that improvement has to be requested of the user of the client terminal 10. Therefore, when the "Resultant response" is "Violation", the client terminal 10 can not establish a connection with the user network 250 until the requested improvement has been done.

Figure 6:
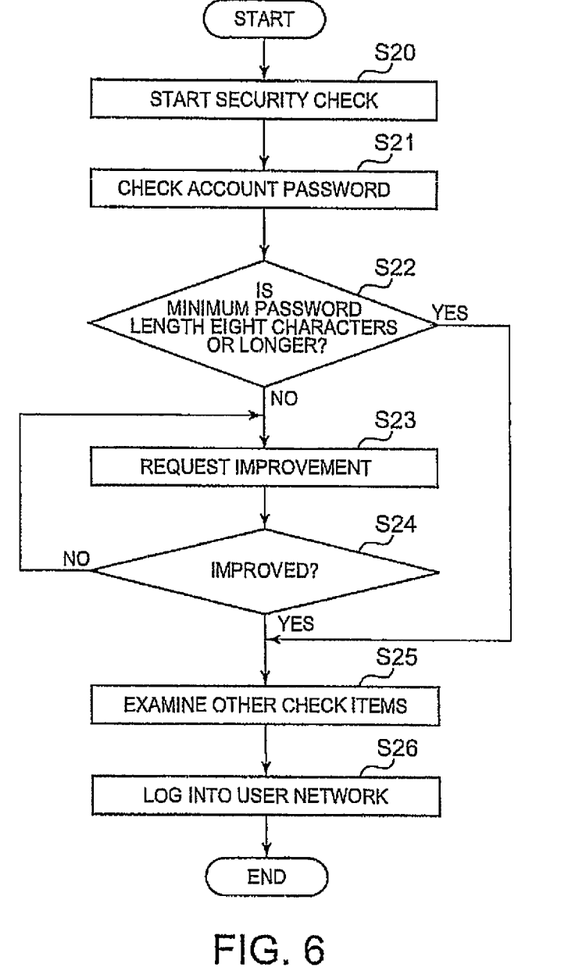
FIG. 6 is a flowchart showing the processing for checking an account password and for issuing an improve request for a client terminal.

As shown in FIG. 5, assume the following setting: the response for the check item "client terminal account password" is "Violation", "minimum password length is eight characters or more", and "longest password usage period is 186 days or less". FIG. 6 shows security measures taken for the client terminal 10 in this case. The client terminal 10 logs in to the quarantine network 200, and the first authentication server 600 starts security check (S20). For example, it checks the first check item "client terminal account password" (S21).

The first authentication server 600 determines whether the settings for the client terminal 10 are "minimum password length is eight characters or more" and "longest password usage period is 186 days or less" (S22). If no setting violation is detected, the first authentication server 600 examines other check items (S25). If a setting violation is found, the first authentication server 600 requests improvement of the user (S23) since it is configured to follow the setting of "Violation".

Figure 7:
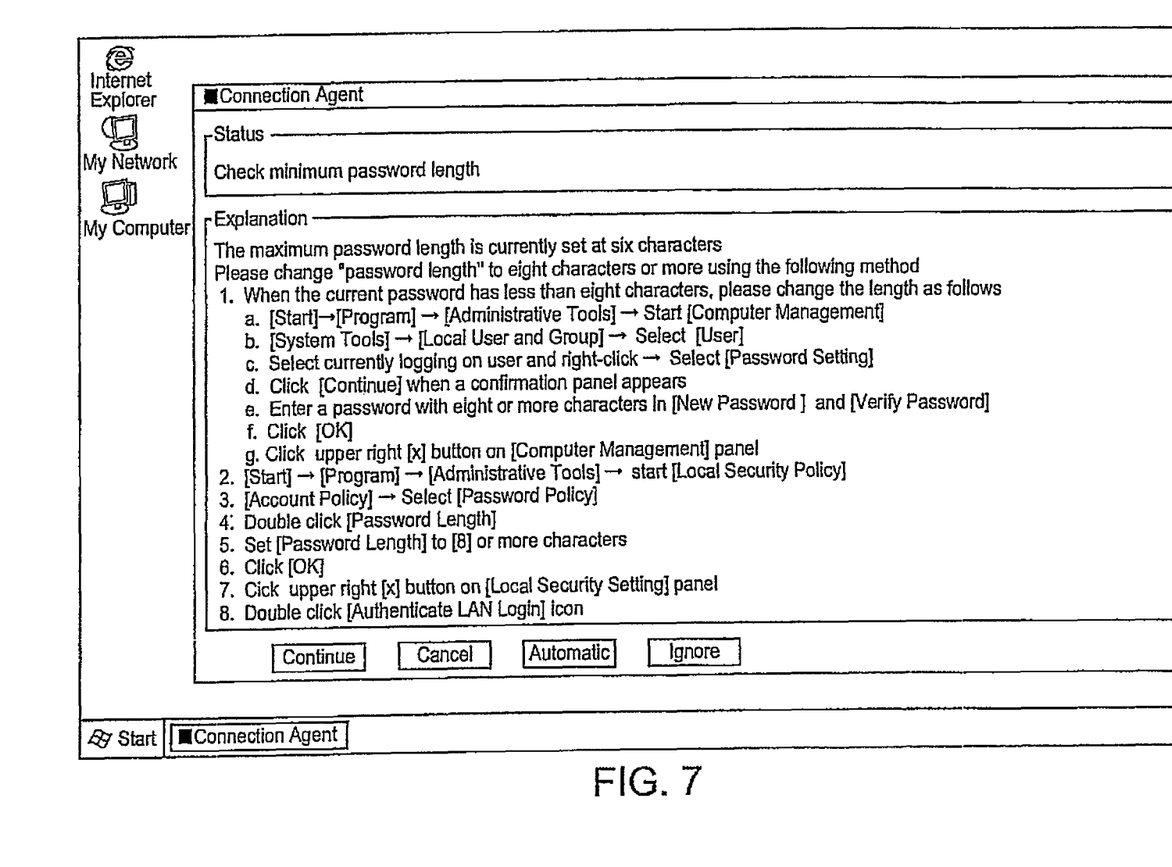
FIG. 7 is a diagram showing messages for prompting on a client terminal to improve a password setting.

Referring to FIG. 7, the agent software (connection agent) for the client terminal 10 displays on the display means 21 a request to improve a password as a security measure. After the user improves the length of the password (S24) in response to the request, the first authentication server 600 examines other check items (S26). For example, a password setting for a screen saver may be included in the other check items, as shown in FIG. 5. This setting indicates that a password should be entered to unlock a screen saver of the client terminal 10 when the client terminal logs in again after the screen saver is activated.

A measure against viruses is included as another check item. In FIG. 5, the first authentication server 600 indicates that an administrator approves only antivirus software A. That is, for a client terminal 10 that has installed antivirus software other than the antivirus software A, an improve request is displayed on the display means 21 of the client terminal 10. Additionally, the first authentication server 600 may determine whether a virus patch has been downloaded.

Items, such as AB123 and CD123, in FIG. 5 are names of patches, and the first authentication server 600 performs one of "Ignore", "Warning" and "Violation" response processes for a client terminal 10 that has not yet installed these patches. In this case, since the first authentication server 600 is configured to follow the setting of "Violation", the first authentication server 600 requests improvement of the user, such as prompting to install the antivirus software A or instructing to download a virus patch.

Check items for the measure against viruses may include checking settings in a parent server for antivirus software, checking the version of antivirus software, checking whether a personal firewall has been installed, and/or checking settings in the parent server for the personal firewall. These antivirus and virus check software programs and files may be stored in the security measure server 500.

An OS patch check is included as another check item. In FIG. 5, KB147222, etc. are shown as OS patches for 051. In the above described manner, the agent software performs an "Ignore", "Warning" or "Violation" response process for a client terminal 10 that has not installed these patches. In this case, since the first authentication server 600 is configured to follow the setting of "Violation", the first authentication server 600 requests improvement of the user to install the OS patches. These OS patches, and software and files for performing version checks of the patches may be stored in the security measure server 500.

An inhibited software check is also included as another check item. In FIG. 5, the agent software performs the "Ignore", "Warning" or "Violation" response process for a client terminal 10 that executes the WinMX software, which is inhibited software. In this case, since the first authentication server 600 is configured to follow the setting of "Violation", the first authentication server 600 requests improvement of the user to stop the execution of the WinMX software.

"Power-on password" and "hard disk password" may be included as other check items. The power-on password is a password to be entered after the client terminal 10 has been powered on and before the OS has been started. The hard disk password is a password to be set for a hard disk of the client terminal 10, which prevents the hard disk from being read by another computer connecting thereto.

When the security check and the security measures for these check items have completed, the client terminal 10 is permitted to be connected to the user network 250 (S26).

Figure 8:
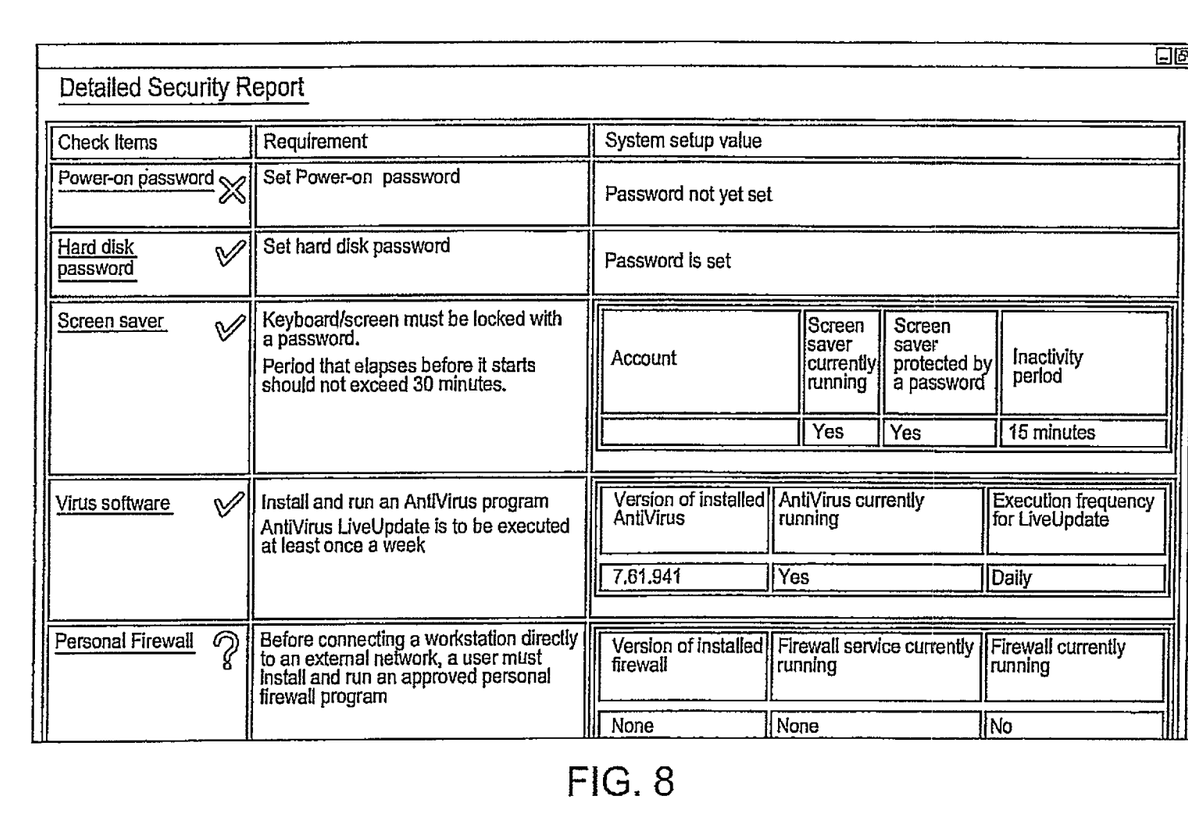
FIG. 8 is a diagram showing an exemplary screen for presenting security check results on a client terminal.

The security measures may be successively taken, as shown in FIG. 6, i.e., a security check for one check item is performed, then a request to improve the checked item is issued; a next security check is performed, then an improve request is issued, and so on. Alternatively, as shown in FIG. 8, security checks for all the check items in FIG. 5 may be performed and then the results may be displayed as a list on the display means 21. For example, for the check items having the "Warning" response, the user may be warned with a list as shown in FIG. 8.

Each of the common certificate and the user certificate in the present invention is a digital certificate that may be the one defined, for example, in ITU-T Recommendation X. 509. A certificate may include personal information (department name, ID, user name, etc.), a public key, expiration, a serial number and a signature. Such certificates are issued by a CA server, and the common and user certificates are stored in the second authentication server 700.

The first or the second authentication server 600 or 700 transmits the common certificate and the user certificate to the client terminal 10, and the client terminal 10 stores them in the storage means 23. While each certificate may be used as a certificate set up for an Internet browser of Windows®, it is stored in the storage means 23 to prevent the user of the client terminal 10 from copying it in the present embodiment. For example, since the certificate is stored only in the memory of the client terminal 10 and not stored on the hard disk as a file, unauthorized copying, exporting and importing of the certificate by the user can be avoided. The certificate may be encrypted and then stored in the storage means 23.

The common certificate is used to connect a client terminal 10 to the quarantine network 200, and the user certificate is used to connect the client terminal 10 to the user network 250. By using the two certificates, connection of the client terminal 10 to a network such as the intranet is performed step by step.

That is, connection to the quarantine network 200 is permitted by the common certificate, and after the security check is performed and the security measures are taken, connection to the fundamental user network 250 is permitted by the user certificate. Thus, the connection to the user network 250 is permitted only for a client terminal 10 that has satisfied the security requirements, and thereby, the security of the user network 250 is maintained.

The administrator of the user network 250 (hereinafter referred to simply as an "administrator") sets, for each user who accesses the user network 250, a user ID, a password, and a common certificate and a user certificate issued by the CA server in the second authentication server 700.

A client terminal 10 is first connected to the quarantine network 200 in preparation for connection to the user network 250. However, a client terminal 10 that is not registered with the second authentication server 700 is not connected even to the quarantine network 200. To connect to the quarantine network 200, the user of such a client terminal 10 must start the OS, and enter a user ID and a password registered with the user network 250. Therefore, unless a user ID and a password are registered with the second authentication server 700, a client terminal 10 is not permitted to enter the quarantine network 200.

An explanation will now be given for the processing that is performed before a client terminal 10 that has not installed the agent software is connected to the user network 250. In order for the security measures to be taken, the client terminal 10 must have installed the agent software. However, it would be risky for the user network 250 to permit the client terminal 10 to download the agent software because the security measures have not yet been taken for this client terminal 10. That is, it would constitute a great threat to the system to connect to the user network 250 a client terminal 10 that has not yet installed the agent software.

Therefore, the authentication apparatus 100 connects such a client terminal 10 to a guest network 230 (see FIG. 1). The guest network 230 may be a network physically separated from the quarantine network 200 and the user network 250, or prepared separately as a VLAN.

When the authentication apparatus 100 recognizes that the communication means 25 of a client terminal 10 has started by the activation of the communication means 25 or an Internet browser, the authentication apparatus 100 connects the client terminal 10 to the guest network 230, and the client terminal 10 downloads a setup file (hereinafter referred to as "Setup.exe file") via the guest network 230. The Setup.exe file is a file that is stored in the first authentication server 600 and serves as a replacement for the agent software used to connect a client terminal 10 to the quarantine network 200. The client terminal 10 executes the received Setup.exe file, which prompts the user to enter a user ID and a password and, when entered, transmits the user ID, the password, and an equipment serial number, a CPU serial number, and a MAC address of a network card of the client terminal 10 to the first authentication server 600 via the quarantine network 200.

Figure 9:
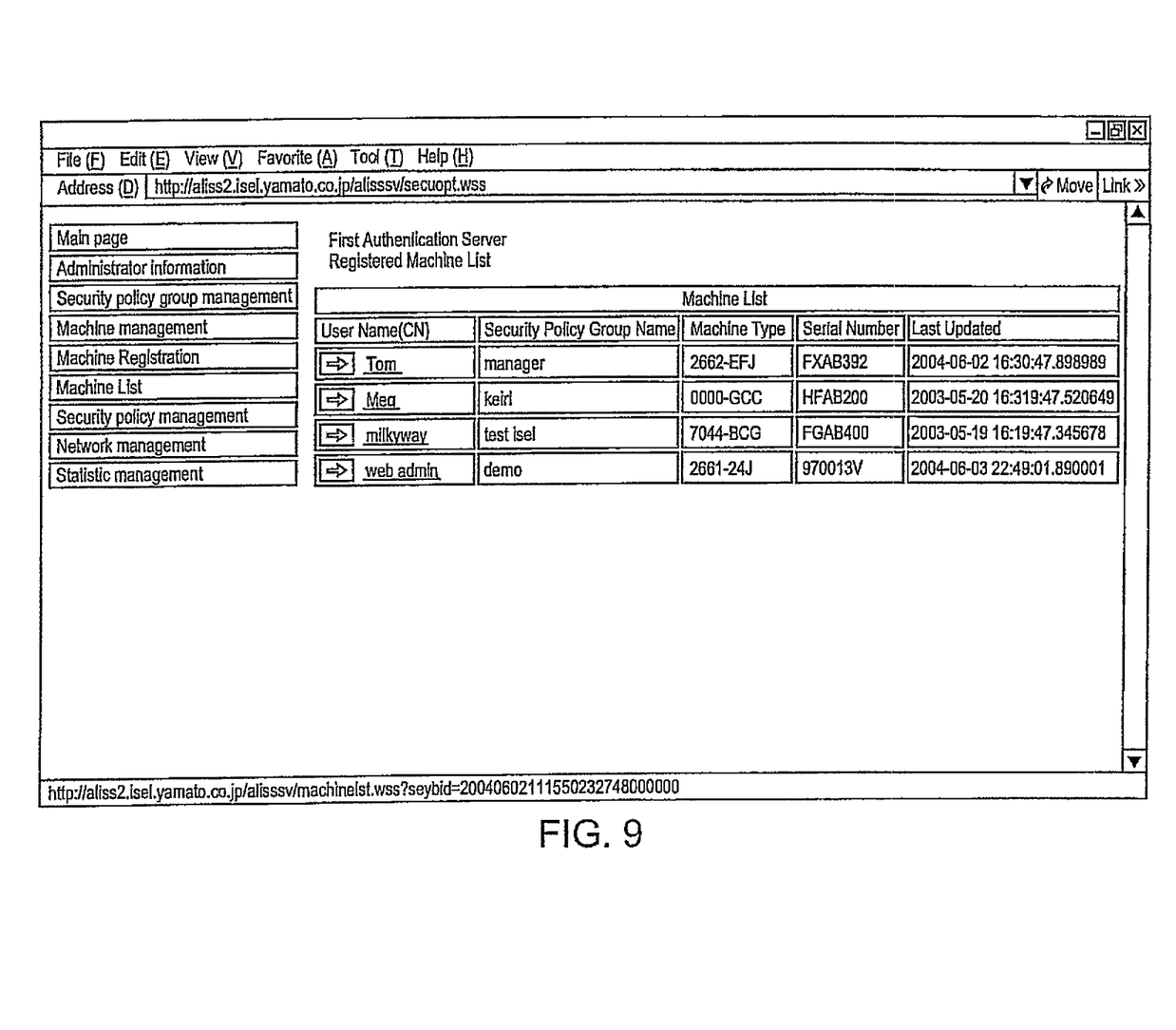
FIG. 9 is a diagram showing a registered machine list of the first authentication server.

The first authentication server 600 stores a registered machine list of the client terminals 10 that are permitted to be connected to the user network 250. As shown in FIG. 9, the registered machine list includes, for each user, a user name, a machine type, a serial number and last updated. The machine type may be an equipment serial number, and the serial number may be an equipment serial number, a CPU serial number or a MAC address of a network card. The registered machine list may be entered in advance by the administrator and stored in the first authentication server 600 in association with user IDs and passwords.

The first authentication server 600 compares, with the user names and the machine types on the registered machine list, the user ID, the password, and information of the client terminal 10 (hereinafter referred to as "client terminal identification information"), such as an equipment serial number, a CPU serial number and a MAC address of a network card, which are sent to the first authentication server 600 through the execution of the Setup.exe. Once the client terminal 10 is authenticated, the first authentication server 600 generates an agent, and transmits the agent software to the client terminal 10. The client terminal 10 receives and installs the agent software, and thereafter, the processing beginning at step S14 is performed to permit the client terminal 10 to log on to the user network 250.

As shown in FIG. 9, servers available in the user network 250 may be limited by establishing a security policy for each user. According to the security policy, Tom shown in FIG. 9, for example, who belongs to a security policy group "manager", can access to a server approved for the group "manager". For example, the server approved for the group "manager" is a server storing information that only a person at an administrator level can read. Further, since the security policy group to which Meg belongs is "keiri", Meg can access only to a server approved for the group "keiri". For example, assuming Meg is in charge of accounting, she can access only to a server storing information related to accounting, but can not access to any server storing information that only a person at an administrator level can read.

The security policy may be stored in the first authentication server 600, or in the second authentication server 700. In the preferred embodiment, the security policy is stored in the second authentication server 700, and is applied to limit access to the user network 250 by the applied security policy after a user certificate is set for a client terminal 10.

The quarantine system and the quarantine method according to the above embodiment can be implemented by a program that is executed by servers, including the security measure server 500, the first authentication server 600, the DHCP server 800, and the second authentication server 700 (see FIG. 1). A storage medium storing the program is a computer program product, wherein the storage medium may be an optical storage medium, such as a DVD, an MO or a PD, a tape recording medium or a semiconductor memory. A storage device, such as a hard disk or a RAM, provided for the servers connected to a private communication network or to the Internet, may be employed as a storage medium, which provides the program via the network.

While the embodiment of the present invention has been described, it is merely an example, and does not limit the scope of the present invention. Further, the advantages described in the above embodiment are merely the most preferable ones obtained from the invention, and the present invention has other advantages not described in the embodiment.

INDUSTRIAL APPLICABILITY

The present invention can be applied to a network, such as an intranet used by a company or other organization, and can provide security management at a fixed or higher level for multiple client terminals, while reducing the burden imposed on the administrator. Further, the invention can also be applied for an Internet service provider (hereinafter referred to as an "ISP"). When the present invention is implemented in an ISP, the ISP can provide security management for computers of clients connected to the network provided by the ISP.

The invention claimed is:

1. A quarantine method for allowing a client terminal to connect to a user network, said method comprising:

an authentication apparatus recognizing that a communication means of the client terminal has been activated, wherein the authentication apparatus is directly connected to a quarantine network, to the user network, and to the client terminal;

responsive to said recognizing, said authentication apparatus confirming a common certificate for the client terminal;

after said confirming the common certificate, providing an Internet Protocol (IP) address to the client terminal to enable the client terminal to log in to the quarantine network;

after said providing the IP address, connecting the client terminal to the quarantine network;

responsive to the client terminal having connected to the quarantine network, a first authentication server security checking the client terminal to determine whether each check item of a plurality of check items has a violation; and after said checking the client terminal, allowing the client terminal to connect to the user network, said allowing comprising a second authentication server confirming a user certificate for the client terminal followed by said second authentication server storing the user certificate in the client terminal, wherein the first authentication server and the second authentication server are physically distinct hardware servers.

2. The method of claim 1, wherein said providing the IP address is performed by a Dynamic Host Configuration Protocol (DHCP) server, and wherein the DHCP server is physically distinct from the first authentication server and the second authentication server.

3. The method of claim 2, wherein the user network is disposed between the DHCP server and the authentication apparatus on a connection path that connects the DHCP server to the authentication apparatus.

4. The method of claim 3, wherein the DHCP server and the first authentication server are each directly connected to the quarantine network, and wherein the second authentication server and the DHCP server are each directly connected to the user network.

5. The method of claim 1, wherein said security checking determines that at least one check item of the plurality of check items has a violation, and wherein for each check item having a violation as determined via said security checking, said security checking further comprising a security measure server performing a security measure to improve the check item with respect to the violation.

6. The method of claim 1, wherein said security checking determines that at least one check item of the plurality of check items has a violation, and wherein the plurality of check items comprises a client terminal account password check, a hard disk password check, a check for a password for setting a screen saver, a virus patch check, an operating system patch check, and an inhibited software execution check.

7. The method of claim 1, wherein a connection of the client terminal to the user network is limited by a security policy that is specific to each user of the client terminal, wherein each user of the client terminal can access a server of the user network approved for a security policy group to which said each user belongs.

8. The method of claim 5, wherein the user terminal is connected to the quarantine network by a first connection between the user terminal and the authentication apparatus and a second connection that directly connects the authentication apparatus to the quarantine network;

wherein the user terminal is connected to the user network by the first connection and a third connection that directly connects the authentication apparatus to the user network;

wherein the quarantine network is directly connected to the user network by a fourth connection that directly connects the quarantine network to the user network;

wherein the security measure server is connected to the quarantine network by a fifth connection that directly connects the security measure server to the quarantine network;

wherein the first authentication server is connected to the quarantine network by a sixth connection that directly connects the first authentication server to the quarantine network; and wherein the second authentication server is connected to the user network by a seventh connection that directly connects the second authentication server to the user network.

9. The method of claim 8, wherein the method comprises:

responsive to said recognizing, connecting the client terminal to a guest network by the authentication apparatus, said guest network being directly connected to both the authentication apparatus and the first authentication server;

responsive to said connecting the client terminal to the guest network, said client terminal downloading a setup file from the first authentication server via the guest network;

after said downloading the setup file, said client terminal connecting to the quarantine network via the setup file while agent software for engaging in said security checking is not installed in the client terminal;

after said client terminal connecting to the quarantine network via the setup file, said first authentication server authenticating the client terminal;

after said authenticating the client terminal, said first authentication server transmitting the agent software to the client terminal;

after said transmitting the agent software to the client terminal, installing the agent software in the client terminal; and after said installing the agent software in the client terminal, said first authentication server performing said security checking.

10. A quarantine system comprising an authentication apparatus, a quarantine apparatus comprising servers, and a storage medium for storing a program configured to be executed on the servers to perform a method for allowing a client terminal to connect to a user network, said method comprising:

said authentication apparatus recognizing that a communication means of the client terminal has been activated, wherein the authentication apparatus is directly connected to a quarantine network, to the user network, and to the client terminal;

responsive to said recognizing, said authentication apparatus confirming a common certificate for the client terminal;

after said confirming the common certificate, providing an Internet Protocol (IP) address to the client terminal to enable the client terminal to log in to the quarantine network;

after said providing the IP address, connecting the client terminal to the quarantine network;

responsive to the client terminal having connected to the quarantine network, a first authentication server security checking the client terminal to determine whether each check item of a plurality of check items has a violation; and after said checking the client terminal, allowing the client terminal to connect to the user network, said allowing comprising a second authentication server confirming a user certificate for the client terminal followed by said second authentication server storing the user certificate in the client terminal, wherein the first authentication server and the second authentication server are physically distinct hardware servers.

11. The system of claim 10, wherein said providing the IP address is performed by a Dynamic Host Configuration Protocol (DHCP) server, and wherein the DHCP server is physically distinct from the first authentication server and the second authentication server.

12. The system of claim 11, wherein the user network is disposed between the DHCP server and the authentication apparatus on a connection path that connects the DHCP server to the authentication apparatus.

13. The system of claim 12, wherein the DHCP server and the first authentication server are each directly connected to the quarantine network, and wherein the second authentication server and the DHCP server are each directly connected to the user network.

14. The system of claim 11, wherein the quarantine apparatus comprises the quarantine network, the user network, the first authentication server, the DHCP server, and the second authentication server.

15. The system of claim 10,
wherein said security checking determines that at least one check item of the plurality of check items has a violation, and
wherein for each check item having a violation as determined via said security checking, said security checking further comprising a security measure server performing a security measure to improve the check item with respect to the violation.

16. A computer program product, comprising a physically tangible storage device having a program embodied therein, said program configured to be executed on servers to perform a method for allowing a client terminal to connect to a user network, said method comprising:

an authentication apparatus recognizing that a communication means of the client terminal has been activated, wherein the authentication apparatus is directly connected to a quarantine network, to the user network, and to the client terminal;

responsive to said recognizing, said authentication apparatus confirming a common certificate for the client terminal;

after said confirming the common certificate, providing an Internet Protocol (IP) address to the client terminal to enable the client terminal to log in to the quarantine network;

after said providing the IP address, connecting the client terminal to the quarantine network;

responsive to the client terminal having connected to the quarantine network, a first authentication server security checking the client terminal to determine whether each check item of a plurality of check items has a violation; and after said checking the client terminal, allowing the client terminal to connect to the user network, said allowing comprising a second authentication server confirming a user certificate for the client terminal followed by said second authentication server storing the user certificate in the client terminal, wherein the first authentication server and the second authentication server are physically distinct hardware servers.

17. The computer program product of claim 16, wherein said providing the IP address is performed by a Dynamic Host Configuration Protocol (DHCP) server, and wherein the DHCP server is physically distinct from the first authentication server and the second authentication server.

18. The computer program product of claim 17, wherein the user network is disposed between the DHCP server and the authentication apparatus on a connection path that connects the DHCP server to the authentication apparatus.

19. The computer program product of claim 18, wherein the DHCP server and the first authentication server are each directly connected to the quarantine network, and wherein the second authentication server and the DHCP server are each directly connected to the user network.

20. The computer program product of claim 16,
wherein said security checking determines that at least one check item of the plurality of check items has a violation, and
wherein for each check item having a violation as determined via said security checking, said security checking further comprising a security measure server performing a security measure to improve the check item with respect to the violation.

* * * * *